A. REID.
Potato Baker.
No. 69,480.
Patented Oct. 1, 1867.
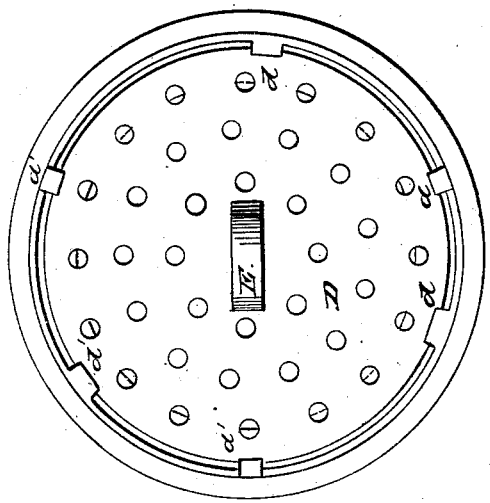
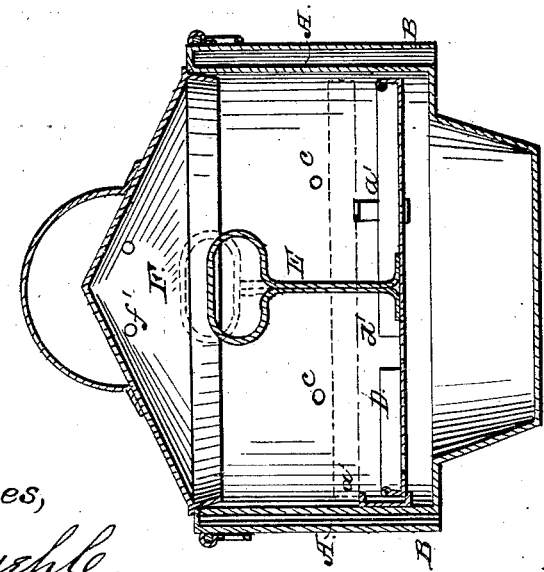

United States Patent Office.

ADAM REID, OF BUFFALO, NEW YORK.

Letters Patent No. 69,480, dated October 1, 1867.

---

POATO-BAKER.

---

The Schedule referred to in these Letters Patent and making part of the same.

---

TO ALL WHOM IT MAY CONCERN:

Be it known that I, ADAM REID, of the city of Buffalo, county of Erie, and State of New York, have invented a certain new and improved Potato-Baker; and I do hereby declare that the following is a full and exact description thereof, reference being had to the accompanying drawings, making a part of this specification, in which—

Figure I is a vertical section.

Figure II is a top plan view.

The nature of this invention consists, first, in a potato-baker which may be set within and upon the pot-hole of a cooking-stove, and which has a double wall, with an annular hot-air chamber between, which chamber is open at the bottom and closed at the top, and furnishes the inside of the baker the required quantity of heat for quick baking; second, in a vertically adjustable shelf or rack placed upon the inside of my improved baker, upon which the potatoes are placed for baking.

Letters of like name and kind refer to like parts in each of the figures.

My improved potato-baker is made in a form similar to that of a kettle for boiling, which is now in common use in connection with cooking-stoves. It is made of sheet metal or other suitable material, and has a bottom which is of smaller diameter than the main body, for the purpose of allowing it to be placed in the pot-hole of the stove. An annular chamber, A, is formed around the main body of this vessel by means of the outer shell B, which extends from the top downwardly to the stove. The bottom of this annular chamber is open, but the outer wall rests upon the top of the stove. The top of the chamber is closed. A number of apertures, C, are made in the inner wall for the purpose of establishing a free circulation between it and the inside of the baker. D represents a perforated shelf, upon which the potatoes to be baked are placed. This shelf is supported upon three or more brackets, $a'$, projecting from the inside wall of the baker. Each bracket has two or more projections at different heights from the bottom of the baker. There are three or more notches cut into the edge of the shelf, to correspond in position and number with the brackets $a'$. These notches are shown at $d'$, and are made for the purpose of allowing the shelf to be placed upon either the lower projections of the brackets $a'$, or below, for the purpose of adjusting the shelf to any required action of the heat upon the articles on the shelf. E represents the handle of the shelf, which is attached to the centre thereof, and projects upwardly, as shown at Fig. I. F represents the cover, which may be of any convenient and common construction, and is provided with small perforations or openings, $f'$.

The operation of my improved potato-baker is very convenient and economical. The potatoes being first placed upon the shelf D, and said shelf upon the brackets $a'$, and the cover put on, the baker is set into the pot-hole of the cooking-stove. The outer shell B rests upon the top of the stove, while the bottom enters the pot-hole and comes into immediate contact with the fire. A quick and most perfect baking is the result. It will be observed that the apertures $c$ are located above the shelf D, thereby furnishing an equal distribution of heat to all parts of the potatoes. For baking potatoes with a small fire, in a short time, in warm weather, this improved baker is particularly useful and economical.

What I claim as my invention, and desire to secure by Letters Patent, is—

A potato-baker, made to set upon or into the pot-hole of a cooking-stove, having an inner shelf, D, for the support of the articles to be baked, and a double wall, forming an annular hot-air chamber, A, with apertures C made through the inner wall, substantially as described.

ADAM REID.

Witnesses:
B. H. MUEHLE,
E. B. FORBUSH.